No. 759,524. PATENTED MAY 10, 1904.
A. G. HOHENSTEIN.
STEAM BOILER.
APPLICATION FILED JUNE 1, 1903. RENEWED APR. 15, 1904.
NO MODEL. 5 SHEETS—SHEET 1.

WITNESSES: INVENTOR
Herbert Bradley Archie G. Hohenstein
Fred Kirchner. by Christy and Christy
Att'ys

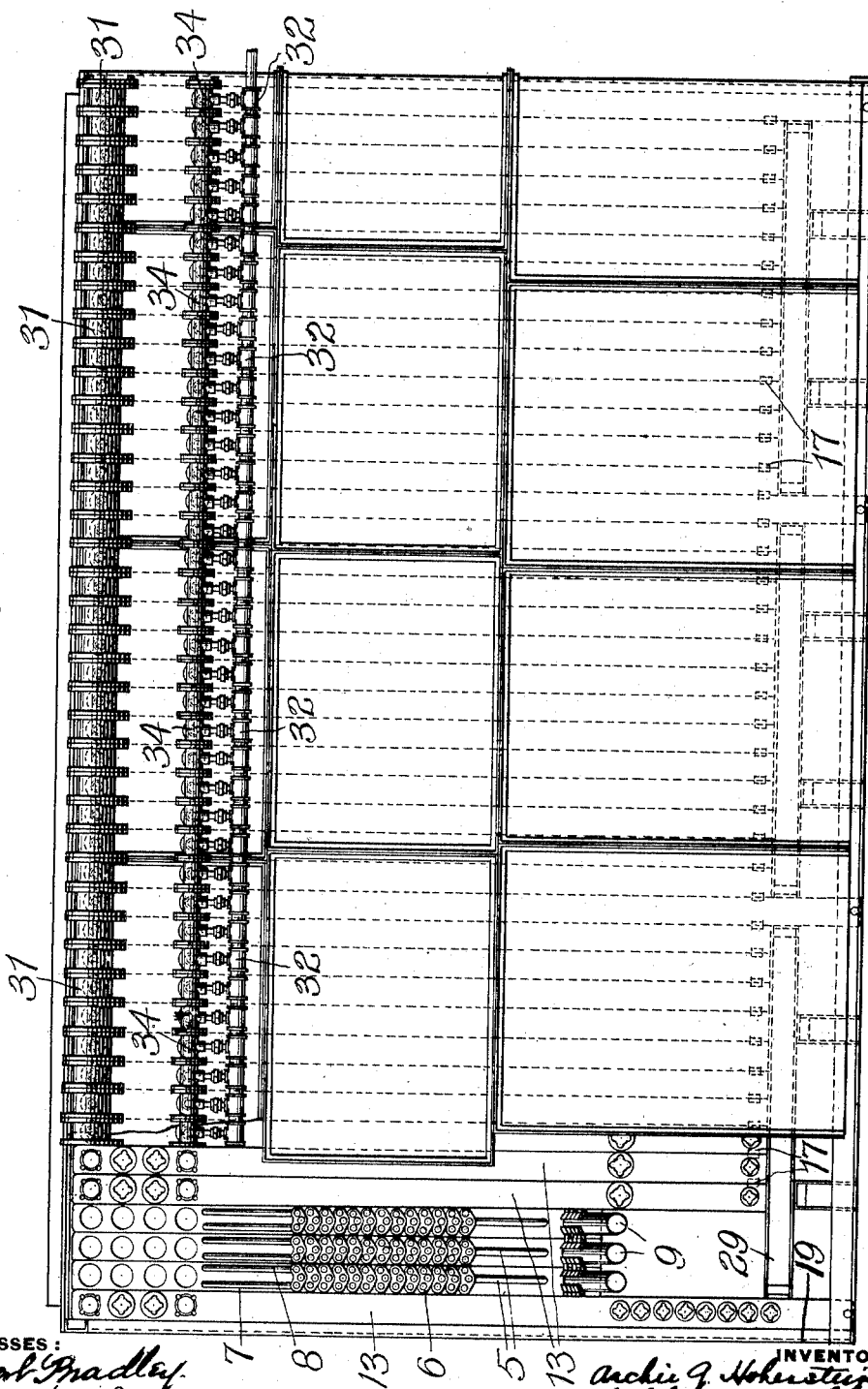

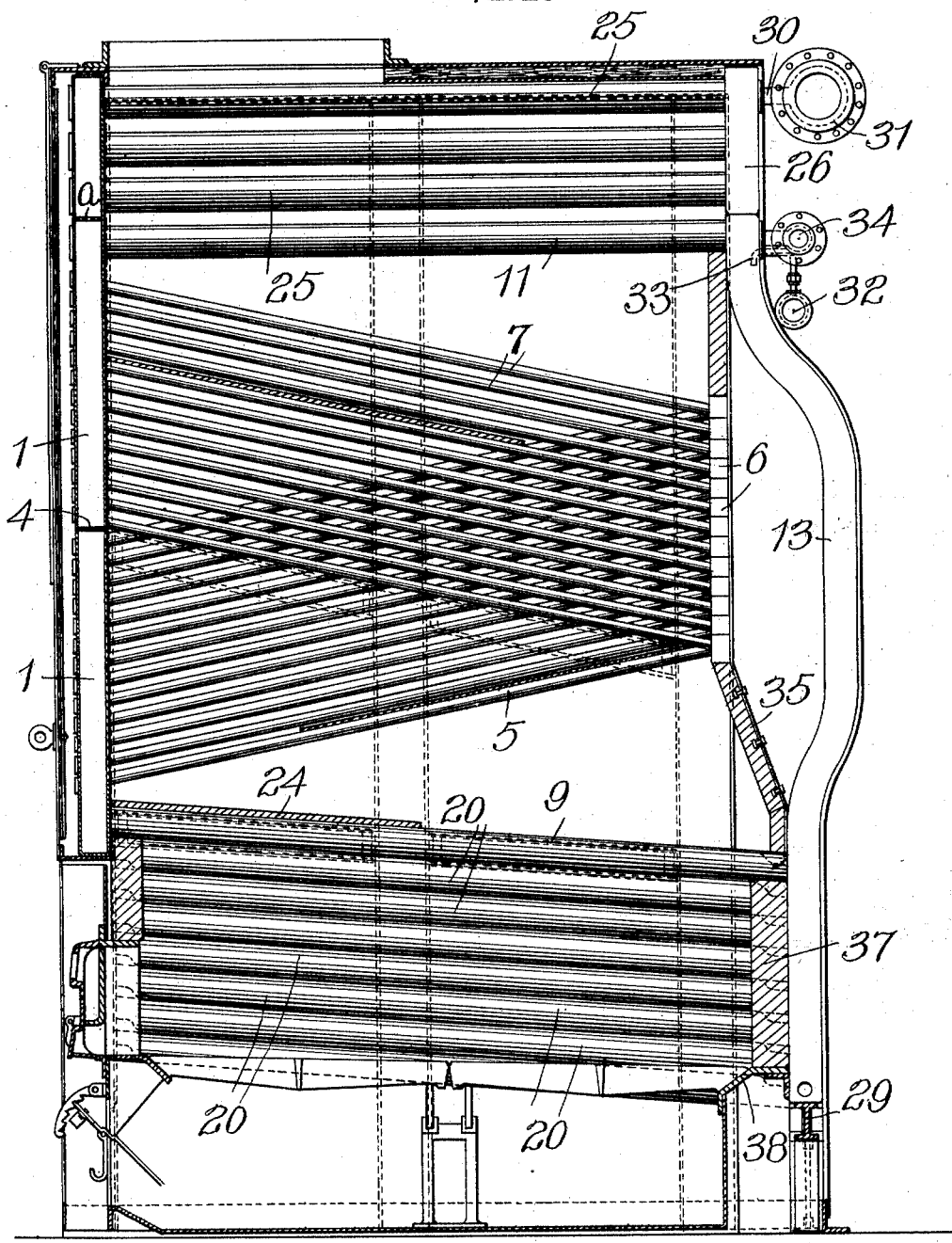

No. 759,524. PATENTED MAY 10, 1904.
A. G. HOHENSTEIN.
STEAM BOILER.
APPLICATION FILED JUNE 1, 1903. RENEWED APR. 15, 1904.
NO MODEL. 5 SHEETS—SHEET 4.
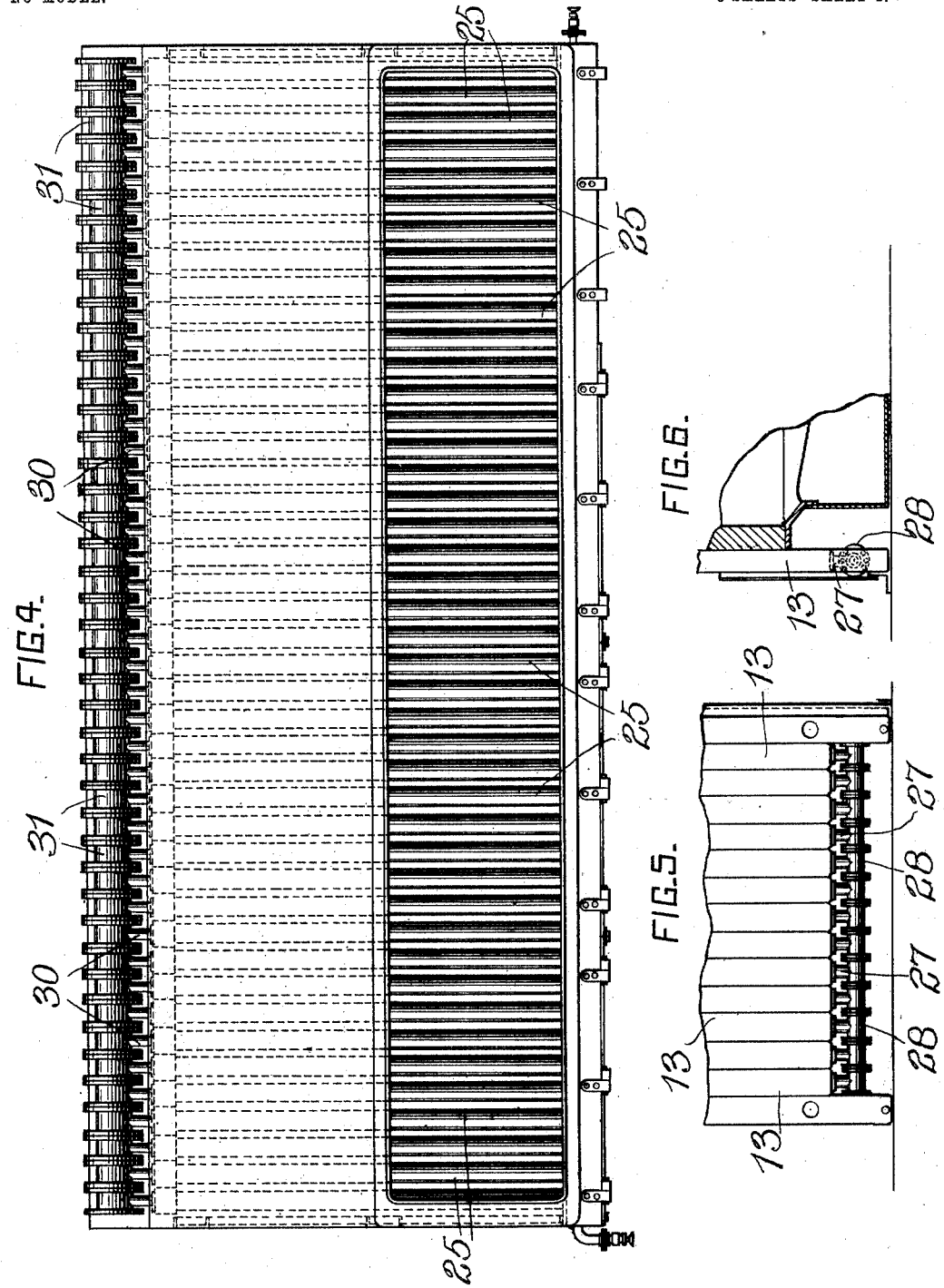
WITNESSES:
Herbert Bradley
Fred Kirchner
INVENTOR
Archie G. Hohenstein
by Christy and Christy
Att'ys No. 759,524. PATENTED MAY 10, 1904.
A. G. HOHENSTEIN.
STEAM BOILER.
APPLICATION FILED JUNE 1, 1903. RENEWED APR. 15, 1904.
NO MODEL. 5 SHEETS—SHEET 5.

WITNESSES: INVENTOR
Herbert Bradley. Archie G. Hohenstein.
Fred Kirchner. by Christy and Christy
Att'y.

No. 759,524.

Patented May 10, 1904.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 759,524, dated May 10, 1904.

Application filed June 1, 1903. Renewed April 15, 1904. Serial No. 203,236. (No model.)

*To all whom it may concern:*

Be it known that I, ARCHIE GERRY HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to certain improvements in water-tube boilers, and has for its object the incorporation in a boiler of this class or kind of what I term my "three-tube" system.

It is also the object of the invention to provide for the division of the boiler into vertical sections or units which may be readily connected to each other or removed from each other, as required.

It is a further object of the invention to provide water-walls for the furnaces in boilers of this class or kind.

The invention is hereinafter more fully described and claimed.

Figure 1:
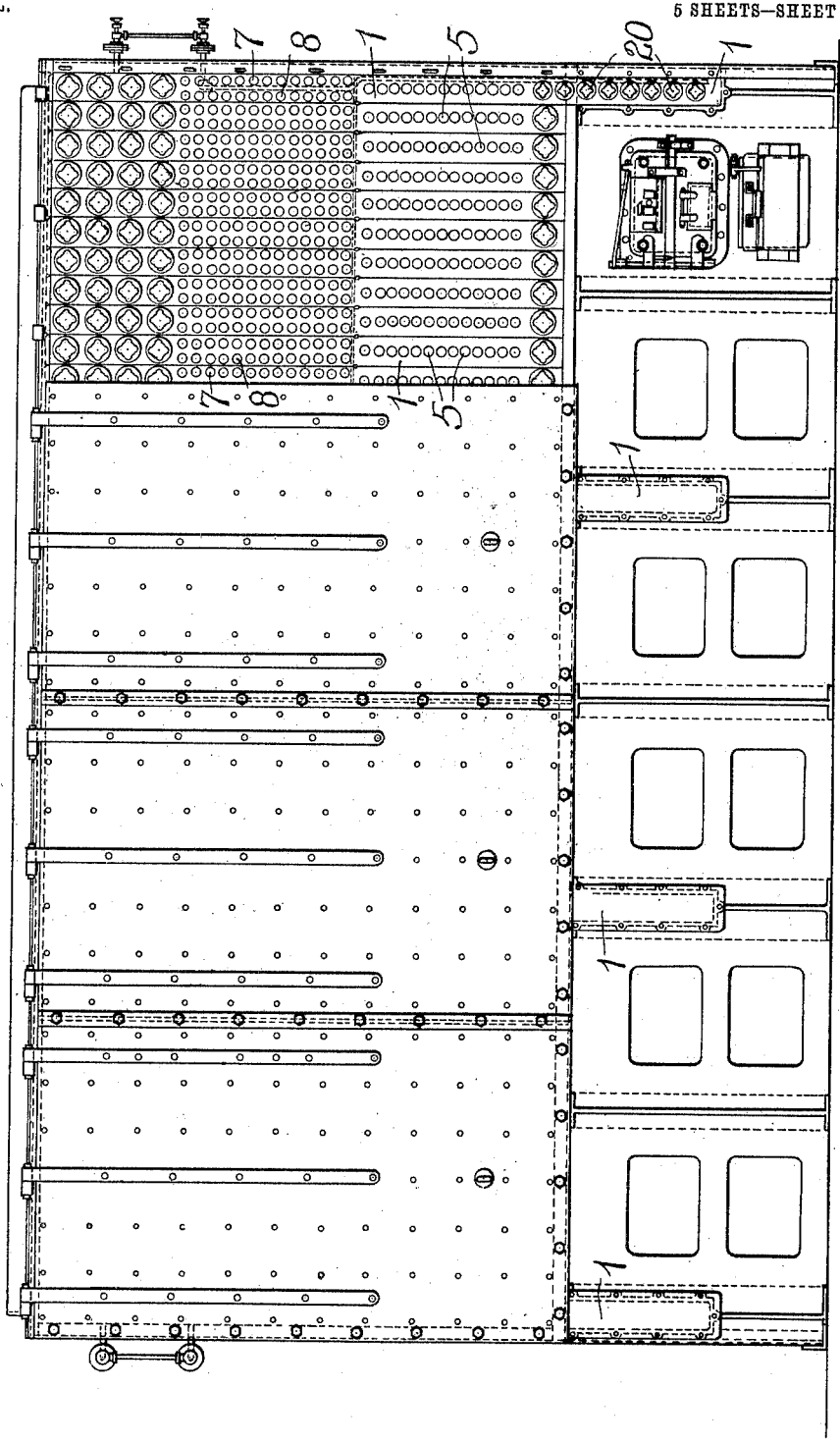
Figure 7:
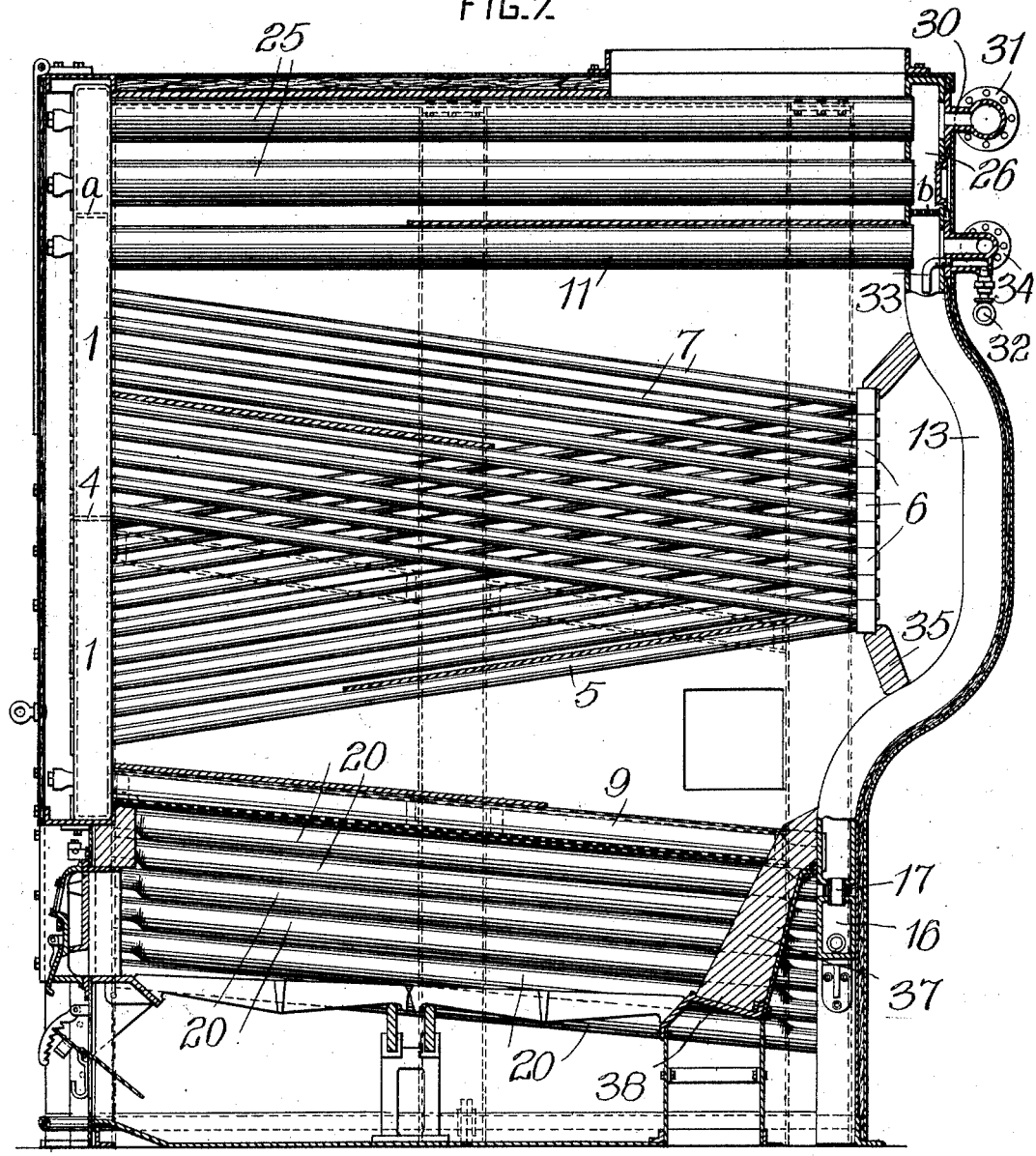

In the accompanying drawings, forming a part of this specification, Figure 1 is a front elevation of my improved boiler, a part of the casing being removed. Fig. 2 is a rear elevation of the same, a portion of the casing being removed. Fig. 3 is a sectional elevation. Fig. 4 is a top plan view. Fig. 5 is a rear elevation of the lower portion of the boiler, showing a modification of the construction shown in Figs. 1, 2, and 3. Fig. 6 is a view, partly in section and partly in elevation, of the construction shown in Fig. 5; and Fig. 7 is a view similar to Fig. 3, illustrating a further modification of the improvement.

In the practice of my invention the series of tubes 5 have their front ends connected to the lower compartment of the double headers 1 or to the lower series of single headers, as described in application Serial No. 159,684, filed June 1, 1903. The rear ends of these tubes are connected to junction-boxes 6, to which are also connected two series of tubes 7 and 8 of smaller capacity than the tubes 5 and having their front ends connected to the upper compartment of the upper headers 1 or to the upper series of single headers. To the upper portions of the headers are connected tubes 11 and also one or more series of tubes 25, as shown in Fig. 3. While not necessary, it is desirable to place in the headers a perforated diaphragm *a* between the points of juncture of the tubes 11 and 25 with the headers to prevent the water from washing up into the superheater-tubes 25, while permitting a free upward passage of the steam. The tubes 11 have their rear ends connected to the upper ends of downtakes 13, while the rear ends of the tubes 25 have their rear ends connected to steam chambers or headers 26, arranged above and preferably supported by the downtakes, as shown in Fig. 3. The downtakes are connected to the lower portions of the front headers by furnace-tubes 9, extending across the boiler immediately above the fire-chamber, as described in the application referred to. The lower ends of the downtakes are connected at points below their junction with the tubes 9 to each other, so as to equalize circulation, by means of nipples 17, as shown in Figs. 2 and 3, or have their lower ends connected to branches 27 of flange-sections 28, which can be connected to each other by bolts or other suitable means, there being one flange-section for each downtake, as shown in Figs. 5 and 6. The downtakes are supported at the lower ends either by I-beams 29, as shown in Figs. 2 and 3, or by the flange-sections, as shown in Fig. 7. In either construction the supporting member has its ends supported by extensions of the downtakes or by other suitable means.

As shown in Figs. 1 and 2, the end headers are extended downwardly, and these downward extensions 21 are connected by a series of tubes 20 with the extensions 19 of the end downtakes, said tubes forming water-walls at the sides of the furnace. If it is desired to divide the fire-chamber into two or more sections, intermediate headers are extended downward, and so connected by tubes 20 with intermediate downtakes, the tubes being so connected to the downtakes and headers as to form practically closed water-walls across the furnace.

It will be observed by reference to Figs. 1, 2, and 4 that each of the front headers is connected by three tubes 5, 7, and 8 to a junction-box 6 and by a tube 9 to a downtake. Similarly, the upper portions of the headers are connected to the downtake by tubes 11. By this construction a section or unit of the boiler is formed. In order to carry out this sectional feature, the upper portions of the headers 1 are connected to the sectional steam-headers, and each of the latter is connected by branches 30 to a steam-pipe formed of flange-sections 31, adapted to be connected together by bolts or other suitable means. The water-supply pipe 32 is also made up of separable sections, each provided with a nipple 33, projecting into the upper ends of the downtakes. In order to equalize the water at the upper ends of the downtakes, each of the latter is connected to branches of flange-sections 34, which are adapted to be connected together, thereby forming a continuous waterway along the downtakes having connections to each of the latter.

The junction-boxes 6 are supported by an abutment 35, resting upon the inner ends of the tubes 9, and the upper ends of the downtakes are protected, as against direct impingement of the flame, by a wall 36, supported on the boxes. The lower ends of the downtakes are protected, as against the flame, by a wall 37, supported by a shelf 38, attached to the downtakes and also forming a support for the inner ends of the grate-bars.

As shown in Fig. 7, the steam-headers 26 may be formed integral with the upper ends of the downtakes; but a perforated partition *b* should be arranged between the points of junction of the tubes 11 and 25 with such downtakes, as shown, so as to prevent the water from entering the tubes 25 in any considerable body, and, further, the lower ends of the downtakes may be connected to an equalizing-box 16 by means of nipples 17, said box being supported by brackets secured to extensions of the downtakes.

As shown in Fig. 7, the wall 35, supporting the junction-boxes, may be supported on the downtakes, which are bent so as to form a space between the downtakes and boxes for access to the latter.

It is characteristic of my improvement that the boiler can be divided at any desired point for the addition of new sections or the removal of impaired sections and that by reason of the extensions of the downtakes in the manner shown a boiler may consist of a series of sections independent of each other, except for the connections of the downtake with the water-supply and the steam-supply pipes. These connections are, however, readily separable when necessary.

I claim herein as my invention—

1. A water-tube boiler having in combination two or more detachable or separable units, each unit consisting of two water-chambers arranged on one side of the boiler, three connected series of tubes extending from the opposite side of the boiler, and connected to the water-chambers and return connections from the upper to the lower water-chambers, substantially as set forth.

2. A water-tube boiler having in combination two chambers arranged on one side of the boiler, three connected series of tubes extending from the opposite side of the boiler and connected to said chambers, downtakes connected to said chambers, and superheater-tubes connected at one end to the upper chamber and having their opposite ends connected to the steam-pipe, substantially as set forth.

3. A water-tube boiler having in combination two water-chambers, a steam-chamber connected with the upper water-chamber, three connected series of tubes connected with the water-chambers, downtakes connected to the upper and lower water-chambers, a steam-header and tubes connecting the steam-chamber with said header, substantially as set forth.

4. A water-tube boiler having in combination two water-chambers arranged at the front of the boiler, three connected series of tubes extending from the rear of the boiler to said chambers, downtakes connected to the upper water-chambers, furnace-tubes connecting the downtakes to the lower water-chambers, the downtakes being connected together at points below their junctions with the furnace-tubes, substantially as set forth.

5. A water-tube boiler consisting of two or more detachable or separable units, each unit having in combination two water-chambers arranged at the front of the boiler, three connected series of tubes extending from the rear of boiler to said chambers, two steam-chambers, tubes connecting said chambers, one of said chambers being connected to the upper water-chamber, a downtake connected to the upper water-chamber, and a furnace-tube connecting the downtake to the lower water-chamber, substantially as set forth.

In testimony whereof I have hereunto set my hand.

ARCHIE G. HOHENSTEIN.

Witnesses:
   DARWIN S. WOLCOTT,
   J. C. DAVIDSON.